United States Patent [19]
Hosoda et al.

[11] Patent Number: 5,576,580
[45] Date of Patent: Nov. 19, 1996

[54] DC POWER SUPPLY CIRCUIT

[75] Inventors: Minoru Hosoda; Toru Yoshida; Shigetoshi Ouchi; Haruo Honda; Yasunobu Fujita; Fumihisa Ichikawa; Kouya Yamada, all of Hitachi, Japan

[73] Assignee: Hitachi, Ltd., Tokyo, Japan

[21] Appl. No.: 358,764

[22] Filed: Dec. 19, 1994

[30] Foreign Application Priority Data

Dec. 28, 1993 [JP] Japan ................................ 5-334917

[51] Int. Cl.$^6$ ................................................ H02J 9/06
[52] U.S. Cl. ....................... 307/42; 307/11; 307/39; 335/2; 335/7; 335/18; 361/42; 361/93; 361/139
[58] Field of Search ........................ 307/42, 11, 39; 335/18, 2, 7; 361/139, 42, 93, 96

[56] References Cited

U.S. PATENT DOCUMENTS

| | | | |
|---|---|---|---|
| 3,529,210 | 2/1968 | Ito | 317/20 |
| 4,266,258 | 5/1981 | Eidinger | 361/58 |
| 4,442,472 | 4/1984 | Pang et al. | 361/96 |
| 4,849,848 | 7/1989 | Ishii | 361/96 |
| 5,369,542 | 11/1994 | Leone et al. | 361/94 |

FOREIGN PATENT DOCUMENTS

| | | |
|---|---|---|
| 474186 | 3/1992 | European Pat. Off. . |
| 56-124520 | 9/1981 | Japan . |
| 63-145140 | 6/1988 | Japan . |
| 63-219430 | 9/1988 | Japan . |
| 2090488 | 7/1982 | United Kingdom . |

*Primary Examiner*—Jonathan Wysocki
*Assistant Examiner*—Albert W. Paladini
*Attorney, Agent, or Firm*—Fay, Sharpe, Beall, Fagan, Minnich & McKee

[57] ABSTRACT

A dc power supply circuit connects a plurality of dc circuit breakers to a semi-conductor converter, returning again to the semi-conductor converter through a dc driving part such as an electric railcar connected to each dc circuit breaker. A second dc circuit breaker of larger capacity than the above-mentioned dc circuit breakers is provided in a return circuit and opened when a short circuit current is detected. A current decreasing means opens the second dc circuit breaker to decrease the short circuit current and includes, for example, a series-circuit of a resistor R and a reactor L. The dc power supply circuit has a large interruption capacity with low resistance loss.

10 Claims, 1 Drawing Sheet

5,576,580

DC POWER SUPPLY CIRCUIT

BACKGROUND OF THE INVENTION

1. Field of Industrial Utilization

The invention relates to a dc power supply circuit and improvements in on a return circuit thereof.

2. Description of the Related Arts

A conventional dc power supply circuit such as the feeder circuit disclosed in JP A 56-124520 is constructed in a looped power supply circuit, connecting a plurality of dc circuit breakers to a plurality of diodes, and connected again to rectifiers of the diodes through an electric railcar in contact with a feeder connected to each dc circuit breaker and rails.

In recent years, the performance of semi-conductor elements such as diodes, thyristers, etc. has improved remarkably and, as they are being made lower in loss and larger in capacity, an accident current flows instantaneously (such as an accidential) when short circuit occurs in a dc power supply circuit, circuit containing the semi-conductor element, for instance. The accident current has a characteristic curve A as shown in FIG. 2, and is remarkably larger than an interruption current B of a dc circuit breaker.

As a result, it is impossible to interrupt the current without use of a dc circuit breaker of large interruption capacity, which requires the dc circuit breaker to be made larger. Morever, in an existing dc power supply circuit it may be necessary to be replaced the circuit breaker with a dc circuit breaker of large capacity.

SUMMARY OF THE INVENTION

An object of the present invention is to make a dc power supply circuit small and to provide a dc power supply circuit which is able to be adopted immediately in place of an existing dc power supply circuit.

A dc power supply circuit according to the present invention has a plurality of dc circuit breakers connected to a semi-conductor converter, a second dc circuit breaker of larger capacity than the dc circuit breakers provided in a line returning to the semi-conductor converter through a dc driving unit connected to each of the dc circuit breakers, and current decreasing means connected to the second dc circuit breaker in parallel therewith.

Since an accident current is interrupted by the second dc circuit breaker and it is possible to interrupt the current by using the dc circuit breakers after flowing the current in the current decreasing means (such as a reactor) to decrease the current, dc circuit breakers of smaller capacity than the second dc circuit breaker can be used and the dc power supply circuit can be made small in size and immediately adopted in an existing dc power supply circuit.

DESCRIPTION OF EMBODIMENTS OF THE INVENTION

Figure 1:
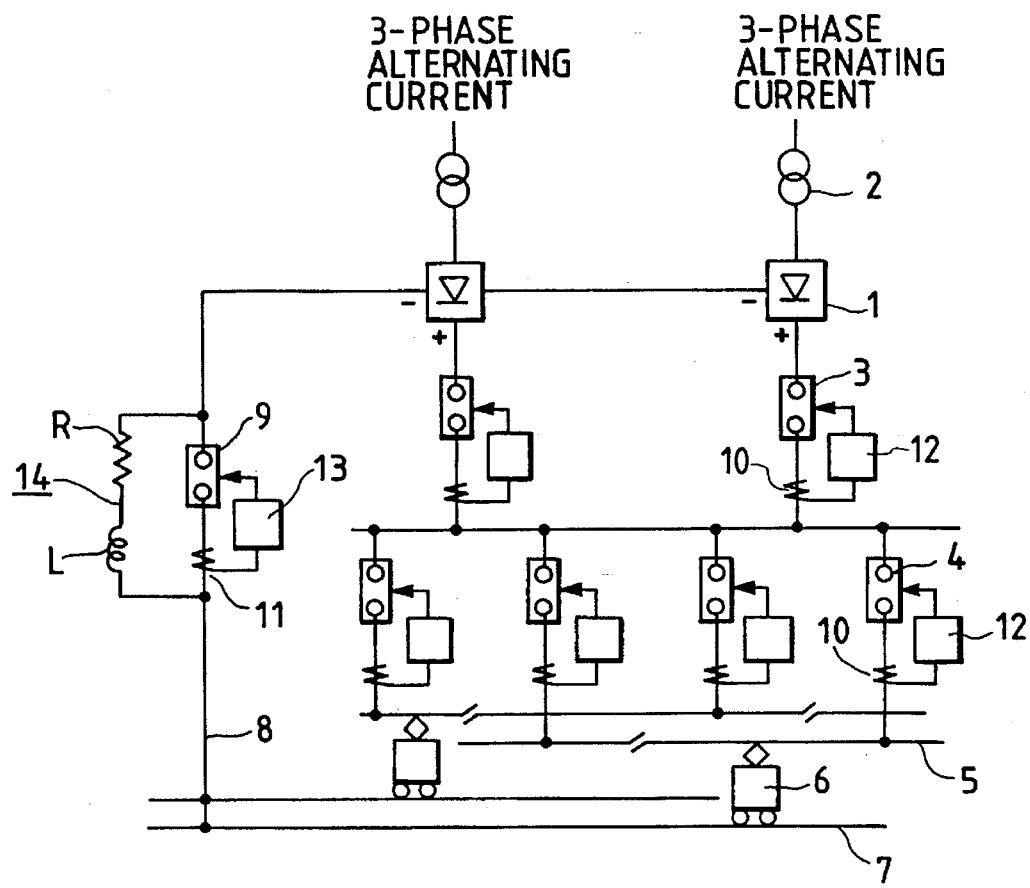
FIG. 1 is a circuit diagram of a dc power supply circuit shown as an embodiment of the present invention.

An embodiment of the present invention is explained hereunder by referring to a preferred example of a dc power supply circuit for electric railcars, shown in FIG. 1.

The dc power supply circuit for electric railcars is constructed as a loop circuit from positive polarity sides of rectifiers such as a plurality of diodes 1, to negative polarity sides of the diodes 1, through dc circuit breakers 3, 4, etc. The diodes 1 are connected to the secondary sides of transformers 2, respectively, and a power source side of each of the transformers 2 is connected to a three-phase alternating current. The positive polarity side of each diode 1 is connected to the dc circuit breaker 3 for power source and the dc circuit breaker 4 for feeder in series. Each dc circuit breaker 4 for feeder is connected to cable 5, and current in the cable 5 flows into a rail 7 through a pantograph and wheels of an electric railcar 6. The rail 7 is connected to the negative polarity side of the diode 1 through a return circuit 8 of the cable (a negative polarity side circuit).

A second dc circuit breaker 9 is connected to the return circuit 8, and has a larger capacity than the dc circuit breaker 3 for electric power source and the dc circuit breaker 4 for feeder. Transformers 10, 11, each of which is connected to the dc power supply circuit for a respective one of the dc circuit breakers 3, 4, 9, are connected to overcurrent relays 12, 13, respectively, in parallel with the corresponding it dc circuit 3, 4, 9.

Figure 2:
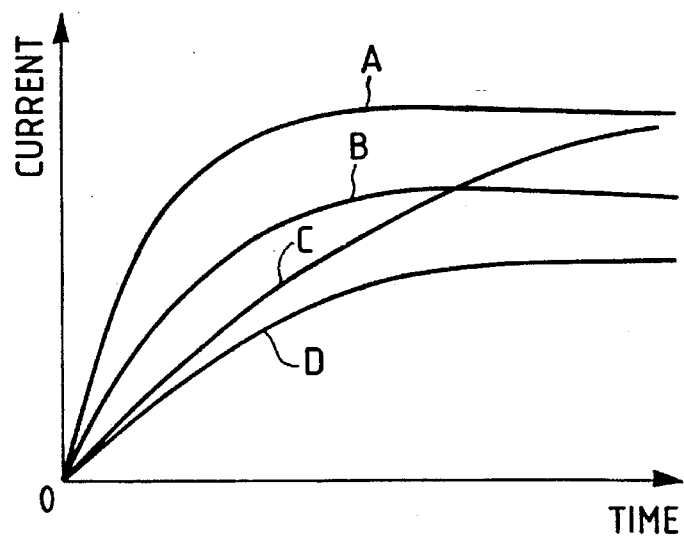
FIG. 2 is a characteristic diagram of accident currents flowing in the circuit of FIG. 1.

The overcurrent relays 12 and 13 operate when set values thereof are at characteristic curves B–D, and A, respectively. FIG. 2 shows characteristic diagrams A–D of curves, showing relationships between accident current at an ordinate and interruption time at an abscissa. The overcurrent relays 12 operate at the characteristic curves B–D, that is, at the accident current that open the dc circuit breakers 3 for power source and dc circuit breakers 4 for feeder. Further, the overcurrent relays 13 operate at the characteristic curve A, that is, at the accident current to open the second dc circuit breaker 9. In other words, the overcurrent relay 13 operates when the relationship of di/dt of the accident current A >di/dt of the accident current B–D, and the overcurrent relays 12 operate when the relationship is contrary to the above relationship. Namely, whether the accident current is before it passes the current decreasing means 14 or after it has passed the means 14 determines whether the dc circuit breaker 9 is interrupted or the dc circuit breakers 3, 4 are interrupted.

Further, the second dc circuit breaker 9 is connected to the means 14 for decreasing current in parallel with it. Means 14 comprises for example, a reactor L connected to a resistor R in series. As other means for decreasing current, any one of the resistor R and the reactor L can be used.

In the circuit shown in FIG. 1, for example, when an accident current occurs due to a short circuit accident of the electric railcar 6 and the accident current A in FIG. 2 flows in the dc power supply circuit for electric railcars, the accident current A is detected by the transformer 11, the overcurrent relay 13 is operated, the second dc circuit breaker 9 is opened, the accident current A flows into the means 14 which decreases the current A to accident current D in FIG. 2, and the accident current D flows. Further, when only the reactor L or only the resistor R is used, the accident current A is decreased to accident current C or accident current B.

As a result, since the dc circuit breaker 3 for power source and the dc circuit breaker 4 for feeder become able to interrupt the accident current D, the dc circuit breaker 3 for power source and the dc circuit breaker 4 for feeder may be small in interruption capacity as compared with the second dc circuit breaker 9; i.e., an existing dc circuit breaker 3 for power source and an existing dc circuit breaker 4 for feeder can be used, and the dc power supply circuit for electric railcars thus can be made small in size, which is economical.

As another embodiment, the present invention, can be used in a dc motor of a dc power supply circuit used in a rolling mill.

As mentioned above, according to the dc power supply circuit of the present invention, when an accident current is detected, the second dc circuit breaker is opened, and the accident current is interrupted by the dc circuit breaker for power source and the dc circuit breaker for feeder after the accident current flowing into the current decreasing means is decreased, so that the dc circuit breaker for power source and the dc circuit breaker for feeder are sufficient, though small in interruption capacity as compared with the second dc circuit breaker, whereby an existing dc circuit breaker 3 for power source and an existing dc circuit breaker 4 for feeder can be used. Thus the dc power supply circuit for electric railcars can be made small in size.

What is claimed is:

1. A dc power supply circuit, connecting a plurality of first dc circuit breakers to a semi-conductor converter and returning again an electric line thereof to said semi-conductor converter through a dc driving unit connected to said first dc circuit breakers, comprising:

a second dc circuit breaker of a larger interruption capacity than said dc circuit breakers; and current decreasing means connected in parallel with said second dc circuit breaker;

wherein said plurality of first dc circuit breakers and said second dc circuit breaker are respectively constructed so that when said second dc circuit breaker is operated on receipt of an accident current so as to interrupt flow of the accident current therethrough, the accident current flows through said current decreasing means, thereby decreasing the accident current such that at least one of said plurality of first circuit breakers then operates to interrupt the decreased accident current flowing through the dc power supply circuit.

2. A dc power supply circuit according to claim 1, wherein said current decreasing means comprises any one of a resistor, a reactor, and a dc circuit in which a reactor and a resistor are connected.

3. A dc power supply circuit according to claim 1, wherein said dc driving unit are used for a dc motor of an electric railcar or a rolling mill.

4. A dc power supply circuit according to claim 1, wherein said plurality of first dc circuit breakers and said second dc circuit breaker are constructed such that a rising rate (di/dt) of the accident current flowing in said dc power supply circuit by opening of said second dc circuit breaker is reduced by passage of the accident current through said current decreasing means, after which at least one of said dc circuit breakers is opened to interrupt the accident current.

5. A dc power supply circuit according to claim 2, wherein said plurality of first dc circuit breakers and said second dc circuit breaker are constructed such that a rising rate (di/dt) of the accident current flowing in said dc power supply circuit by opening of said second dc circuit breaker is reduced by passage of the accident current through said current decreasing means, after which at least one of said dc circuit breakers is opened to interrupt the accident current.

6. A dc power supply circuit according to claim 3, wherein said plurality of first dc circuit breakers and said second dc circuit breaker are constructed such that a rising rate (di/dt) of the accident current flowing in said dc power supply circuit by opening of said second dc circuit breaker is reduced by passage of the accident current through said current decreasing means, after which at least one of said dc circuit breakers is opened to interrupt the accident current.

7. A dc power supply circuit for rectifying ac power to be dc power and for supplying the dc power to a dc drive unit, comprising:

a rectifier for rectifying ac power to be dc power;

at least one first dc circuit breaker connected between said rectifier and said dc drive unit;

a return circuit returning dc power from said dc drive unit to said rectifier;

a second dc circuit breaker connected to said return circuit to interrupt power transmission therethrough; and current decreasing means connected to said return circuit in parallel with said second dc circuit breaker for decreasing current flowing in said return circuit when said second dc circuit breaker is operated to interrupt power supply therethrough;

wherein said second dc circuit breaker has a larger interruption capacity than that of said at least one first dc circuit breaker.

8. A dc power supply circuit according to claim 7, wherein said at least one first dc circuit breaker and said second dc circuit breaker are constructed such that when said second dc circuit breaker is operated on receipt of an accident current to interrupt flow of the accident current therethrough and to allow the accident current to flow through said current decreasing means, the accident current is decreased thereby, and said at least one first dc circuit breaker then operates to interrupt the decreased accident current flowing through the dc power supply circuit.

9. A dc power supply circuit according to claim 8, wherein said rectifier is a diode.

10. A dc power supply circuit for converting ac power into dc power and for supplying the dc power to a dc drive unit, comprising:

a semi-conductor converter for converting ac power to dc power;

a plurality of first dc circuit breakers connected to said power supply circuit between said semi-conductor converter and said dc drive unit;

a return circuit returning power from said dc drive unit to said semi-conductor converter;

a second dc circuit breaker connected to said return circuit to interrupt power transmission therethrough; and a current decreasing means connected to said return circuit in parallel with said second dc circuit breaker for decreasing current flowing in said return circuit when said second dc circuit breaker is operated to interrupt power return therethrough;

wherein said second dc circuit breaker has a larger interruption capacity than that of each of said first dc circuit breakers.

* * * * *